June 23, 1931.  M. THORNTON  1,811,811
LAND LEVELING IMPLEMENT
Filed Nov. 30, 1929   2 Sheets-Sheet 1

Inventor
Myron Thornton,
By Linton, Kellogg Smith
Attorneys

June 23, 1931.　　　　M. THORNTON　　　　1,811,811
LAND LEVELING IMPLEMENT
Filed Nov. 30, 1929　　　2 Sheets-Sheet 2

Inventor
Myron Thornton,
By Linton Kellogg & Smith
Attorneys

Patented June 23, 1931

1,811,811

UNITED STATES PATENT OFFICE

MYRON THORNTON, OF GLENROCK, WYOMING, ASSIGNOR OF FORTY PER CENT TO ROSCOE R. GARDNER, OF GLENROCK, WYOMING

LAND LEVELING IMPLEMENT

Application filed November 30, 1929. Serial No. 410,779.

The present invention relates to agricultural implements and more particularly to a machine adapted to be drawn over an ordinary plowed field in order that the furrows formed, or other uneven places left upon the surface of the ground may be properly leveled in the preparation of the soil, prior to sowing the seed thereon.

Land surfacing or leveling machines of this character generally employ a drag blade whereby the loose earth may be properly spread over that portion of the ground over which the machine is drawn and at the same time, break up the larger clods of earth in order to properly pulverize the ground, and it is the primary purpose of the present invention to provide an adjustable mounting for such blades whereby they may be properly positioned over the ground and retain such adjusted positions so that the machine or implement may be effectually employed upon ground having varying and uneven surfaces to bring such surfaces to a common level and accordingly, permit of the uniform distribution of water over the ground when the latter is irrigated.

A further object is to provide a grader comprising a wheel supported frame having a scraper blade connected thereto and supported thereby, and a sectional arched axle connecting said frame with several of its wheels, whereby the scraper blade may be retained in adjustable position relative to the ground over which the implement travels.

With the above and other objects in view, the invention consists of the novel features of construction, combination and arrangement of parts as will be hereinafter more fully described and particularly pointed out in the accompanying claims.

Figure 1:
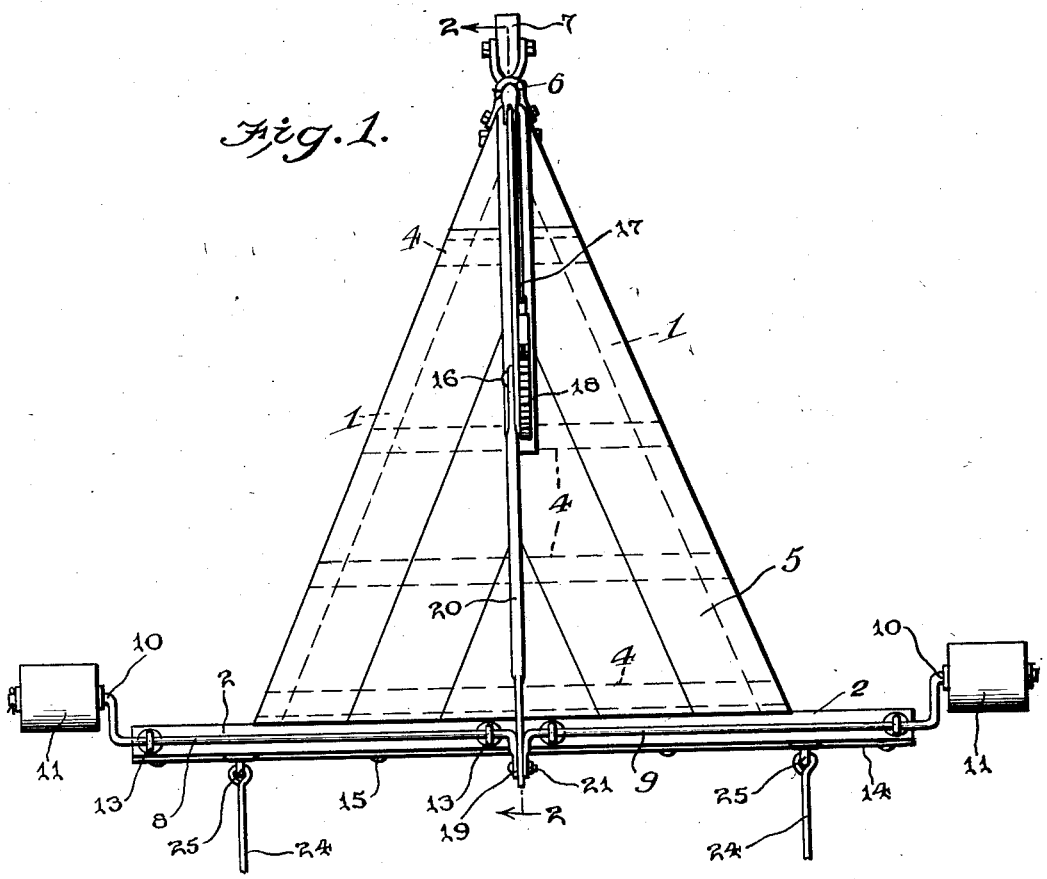
Figure 1 is a plan view of the entire machine embodying the present invention.
Figure 2:
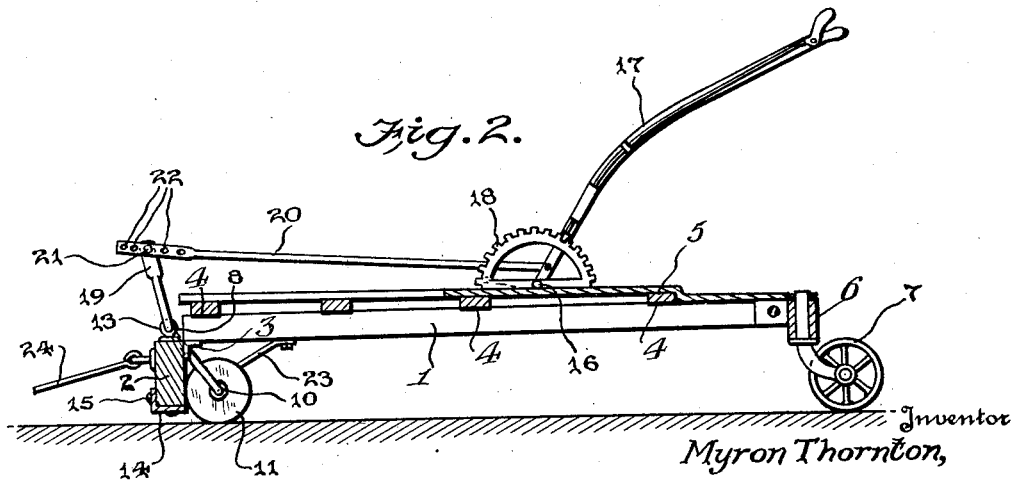
Figure 2 is a longitudinal section through the same taken on the line 2—2 of Figure 1, in the direction of the arrow points.
Figure 3:
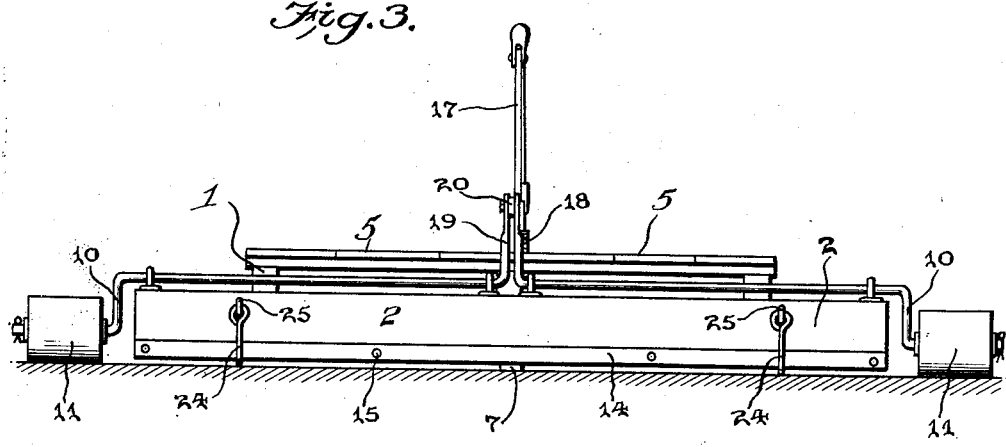
Figure 3 is a front elevation of the same.
Figure 4:
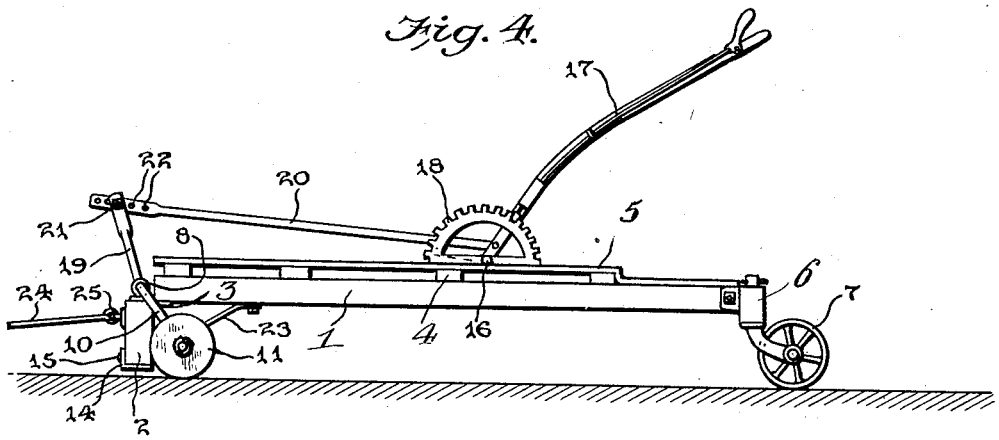
Figure 4 is a side elevation of the surfacing machine.

Referring now more particularly to the accompanying drawings, wherein like and corresponding parts are designated by similar reference characters throughout the several views, the machine comprises a suitably supported wheeled frame preferably of triangular configuration, consisting of a pair of side beams 1, which are connected together adjacent their rearward ends, whereas their forward ends are connected to a laterally extending bar or blade 2 by means of the angle brackets 3. A plurality of transversely extending bars 4 are connected at their outer ends to the side bars 1 and have nailed or otherwise suitably secured thereupon, a platform 5, formed from a plurality of diagonally extending planks or boards as is better illustrated in Figure 1. Secured to the rear or apex end of the frame is a housing 6 in which is rotatably journaled a shaft carrying a castor wheel 7. The scraping and leveling blade 2 is preferably made of wood, in order to lighten the weight of the entire machine but, of course, it may be made of metal, as conditions or preference may dictate. When employing a wooden blade, the lower edge thereof is covered by an angle plate 14 which is secured to the blade by means of the bolt or other fastening element indicated by the numeral 15, in order to reduce the wear upon the blade as the same is dragged over the ground. As will be noted from the drawings, this blade is secured to and depends from the lower faces of the bars 1 adjacent their forward ends and is of a width considerably greater than that of the supporting frame. The lower end of this blade is further braced by the diagonally extending brace bars 23, each of which have one end secured to the side bars 1 of the frame and their opposite or lower ends secured to the lower rear face of the blade 2.

The forward end of the machine is supported by the relatively wide rollers 11 which latter are adjustably connected in such a manner that the blade 2 may be manually raised and retained in such raised position with respect to the ground over which the machine travels in accordance with the scraping or grading work required. Mounted upon the upper face of this blade 2 are a plurality of bearing eyelets 13, through which extend a sectional arched shaft consisting of two sections indicated by the numerals 8 and 9, each section having its outer end bent downwardly as at 10, in order that they may terminate in stub shafts for the rollers 11. The inner ends of the sections 8 and 9 of this arched shaft are bent at right angles, forming the arms 19 and the outer ends of which are adjustably connected to a rod 20. The outer end of this rod 20 is flattened and provided with a plurality of openings 22 through which a bolt 21 may extend for connecting the angle arms 19 of the shaft sections thereto. Pivotally mounted as at 16 upon the platform formed upon the frame of the machine, is a curved lever 17 carrying a manually operable pawl which is adapted to engage a stationary rack 18, also secured upon the platform of the machine. The lever 17 is pivotally connected to the inner end of the rod 20 at a point just above the pivot connection 16, whereby upon the manual movement of the lever 17 about the segmental rack 18, the arched shaft may be caused to rotate within its bearings and thereby cause the forward end of the frame to be raised and lowered with respect to the ground over which it travels and the pawl carried by this lever may engage the rack 18 for retaining the platform, as well as the scraping blade 2 carried thereby, in its adjusted positions.

Connected to the outer face and adjacent each end of this scraper blade 2 by means of the eyelet 25, are the links 24 to which are to be attached the whiffletrees or similar connections whereby a draft animal or tractor may be connected to the machine for propelling the same over the ground.

From the foregoing, it will be obvious that by the employment of relatively wide rollers or wheels 11, the implement may be propelled over plowed or loosened ground, thereby providing a suitable support for the forward end of the implement. As the implement is propelled over the ground, the blade 2 will drag and spread such loosened earth that comes in contact with the forward face thereof into depressions within the surface of the ground, thereby leaving a smooth surface. This scraper blade 2, as it strikes the earth, will also break up or pulverize the soil, thereby eliminating the necessity of harrowing the ground after the implement has once been passed thereover, and properly preparing this soil prior to sowing seed. The positioning of the scraper blade 2 with respect to the ground is governed by the operator during the manipulation of the lever 7.

Manifestly, the construction shown is capable of considerable modification, and such modification as is within the spirit of my claims I consider within the spirit of my invention.

I claim:—

1. A land leveling implement comprising a triangular shaped frame, a castor wheel secured to and carried by the rear or apex end of said frame, a transversely extending scraper bar rigidly secured to and depending from the forward end of said frame, means for adjustably supporting the forward end of the frame whereby the lower edge of said scraper blade may be retained in various positions with respect to the ground over which it travels and a draft connection pivotally connected to the forward face of said scraper bar.

2. A land scraping and leveling machine comprising a triangularly formed frame, a castor wheel supporting one end of said frame, a scraper blade connected to and depending from the forward end of said frame, a crank shaft journaled upon said scraper bar, rollers carried by the outer end of said shaft, a lever pivotally supported upon said frame adjacent the rear end thereof, and a rod operatively connecting said crank shaft with said lever whereby said scraper bar may be manually raised and lowered.

3. A land leveling and scraping implement comprising a triangularly shaped frame, a castor wheel connected to the rear or apex end of said frame, a scraper blade secured to the forward end of said frame and having its opposite ends projecting beyond said frame, a sectional crank shaft connected to said frame, a roller carried by each section of said crank shaft, and manually operable means for said crank shaft whereby said scraper blade may be retained in various adjustable positions with respect to the ground over which the implement travels.

In witness whereof I have hereunto set my hand.

MYRON THORNTON.